No. 776,288. PATENTED NOV. 29, 1904.
J. H. BAKER.
POWER TRANSMITTING DEVICE.
APPLICATION FILED MAR. 7, 1904.
NO MODEL.
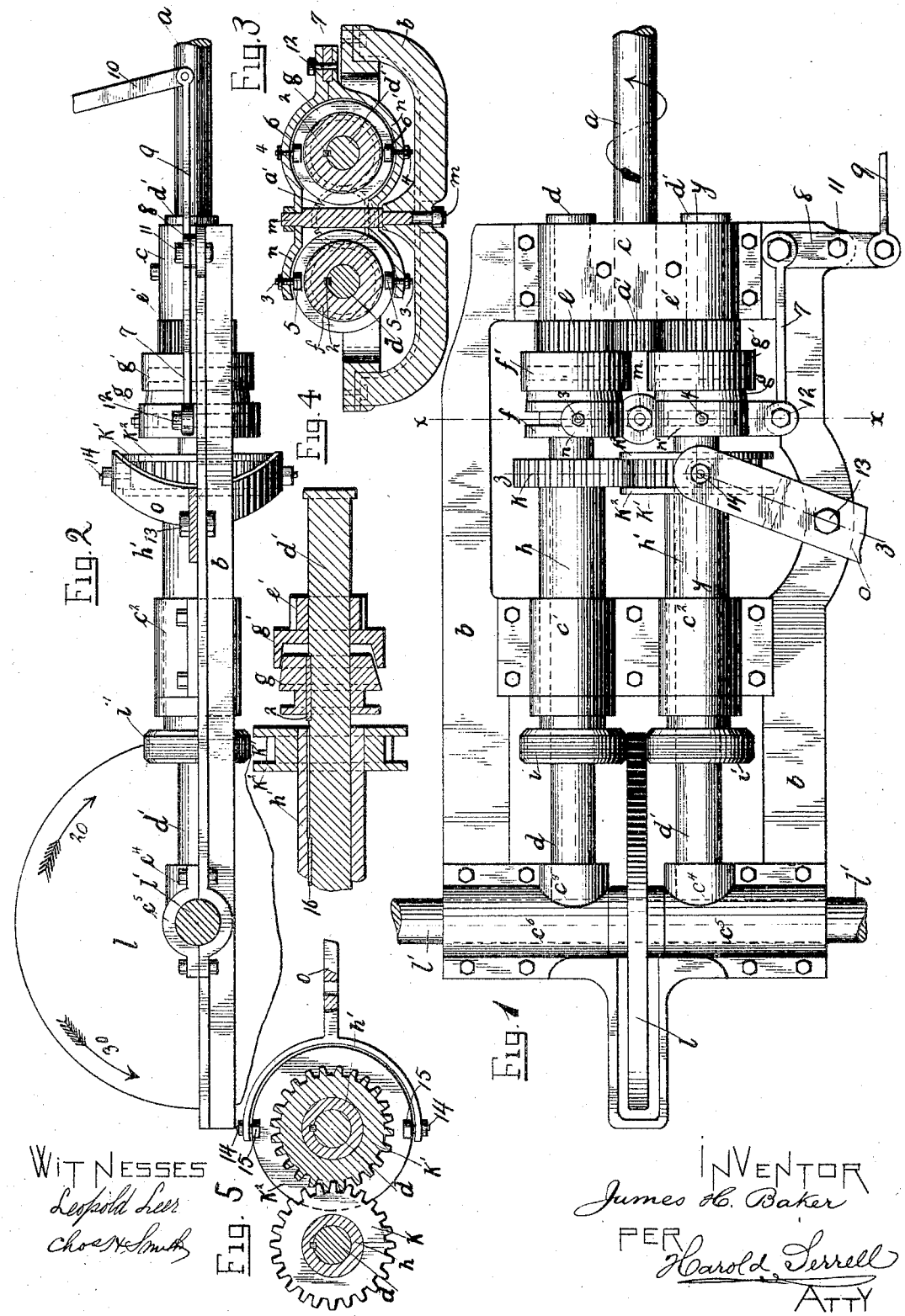
WITNESSES
Leopold Leer
Chas H Smith
INVENTOR
James H. Baker
PER
Harold Serrell
ATTY No. 776,288. Patented November 29, 1904.

UNITED STATES PATENT OFFICE.

JAMES H. BAKER, OF SARATOGA SPRINGS, NEW YORK, ASSIGNOR TO BAKER & SHEVLIN COMPANY, OF SARATOGA SPRINGS, NEW YORK, A CORPORATION OF NEW YORK.

POWER-TRANSMITTING DEVICE.

SPECIFICATION forming part of Letters Patent No. 776,288, dated November 29, 1904.

Application filed March 7, 1904. Serial No. 197,034. (No model.)

*To all whom it may concern:*

Be it known that I, JAMES H. BAKER, a citizen of the United States, residing at Saratoga Springs, in the county of Saratoga and State of New York, have invented an Improvement in Power-Transmission Devices, of which the following is a specification.

My invention relates to a group of mechanical devices for transmitting the power of a prime-mover shaft to a driven shaft in both forward and backward directions and for varying the speed of transmission at the pleasure of the attendant.

The devices comprising my invention are of general application in mechanical devices and arts. I provide, with a prime-mover or power shaft having a gear on one end, two parallel spaced-apart shafts in suitable bearings with loose gears thereon meshing with the gear of the power-shaft. On these parallel shafts are cone-clutches, the cone parts being splined to the shafts, while the cup parts are loose, but secured to the aforesaid loose gears. Surrounding the shafts and in suitable bearings are longitudinally-movable sleeves, upon similar ends of which are friction-wheels, while at the other ends of the sleeves are meshing gears. A friction disk-wheel is mounted on a shaft in suitable bearings and at right angles to the line of the parallel shafts, and the disk-wheel thereon runs between and in contact with the aforesaid friction-wheel. Suitable devices are provided for operating the cone-clutches, so that when one is thrown into engagement to cause a forward movement the other is disengaged and so that when the latter cone-clutch is thrown into engagement to cause a backward or reverse movement the former is disconnected. Means are also provided for simultaneously and longitudinally moving the sleeves, with their friction wheels and gears, so as to bring the operative contact of the friction-wheels and disk-wheel nearer the hub or nearer the periphery of the disk-wheel to increase or reduce the speed of the disk-wheel and its shaft, and so regulate the applied power and movement.

In the drawings, Figure 1 is a plan representing the devices of my improvement. Fig. 2 is a side elevation of the same with a portion of the friction disk-wheel broken away. Fig. 3 is a cross-section at the line $x\ x$ of Fig. 1. Fig. 4 is a longitudinal section at the line $y\ y$ of Fig. 1, and Fig. 5 is a cross-section at the line $z\ z$ of Fig. 1.

The power-shaft or prime mover $a$ is provided at one end with a gear $a'$, mounted in a bearing $c$ of a common frame $b$. This frame $b$, as will be seen by reference to Fig. 3, is of dishing form in cross-section.

$d\ d'$ are parallel shafts spaced apart and coming at opposite sides of one end of the power-shaft $a$. The frame is provided with bearings $c$, $c'$, $c^2$, $c^3$, $c^4$, $c^5$, and $c^6$. The bearing $c$ is a common bearing with the frame for one end of the shaft $a$ and for similar ends of the shafts $d\ d'$, the other ends of the shafts $d\ d'$ being in bearings $c^3\ c^4$. Gears $e\ e'$, loose upon the shafts $d\ d'$, mesh with the gear $a'$ of the shaft $a$. Two cone-clutches are upon the shafts $d\ d'$. One of them comprises the cone part $f$ and cup part $f'$ and the other the cone part $g$ and the cup part $g'$. The cone parts $f\ g$ are mounted upon splines 2 of the shafts $d\ d'$; but the cup parts $f'\ g'$ are loose upon the shafts, but are secured to the gears $e\ e'$, so as to turn therewith. Surrounding the shafts $d\ d'$ are sleeves $h\ h'$, having a predetermined length and mounted in bearings $c'\ c^2$.

On the left-hand end, (as seen in Fig. 1,) of the sleeves $h\ h'$ are secured friction-wheels $i\ i'$, which may be of any desired character. On the other ends of the sleeves $h\ h'$ are meshing gears $k\ k'$, the gear $k$ having side flanges $k^2$, which overlap the edges of the gear $k$, so as to maintain the gears $k\ k'$ in their operative relation with the longitudinal movement herein described for the sleeves $h\ h'$.

A friction disk-wheel $l$ is mounted upon a shaft $l'$ in bearings $c^5\ c^6$ of the frame, the shaft $l'$ being at right angles to the line of the shafts $d$ $d'$ and the friction-disk $l$ coming between the spaced-apart peripheries of the friction-wheels $i$ $i'$. A stud-bolt $m$ occupies a vertical position centrally between the two shafts $d$ $d'$. The lower part thereof passes through the base of the frame $b$, and the center of the said stud-bolt is in line with the center of the parts $f$ $g$ of the cone-clutches. Pivoted to the upper and lower portions of this stud-bolt are yoke-frames $n$ $n'$.

Referring to Fig. 3, the right-hand ends of these yoke-frames come together, and they are joined together and pivoted to a link 7 at the pivot-pin 12. The other end of the link 7 is pivotally connected to one end of a rocker-arm 8, the rocker-arm in turn being connected by a pivot-bolt 11 to the frame $b$. A link 9 is pivotally connected to the opposite end of the rocker-arm 8, and a lever 10, pivoted to a fixed point, is at its other end pivotally connected to the link 9. The yoke-frames $n$ $n'$ are at one side of the stud-bolt $m$ connected to the grooved cone-clutch $f$ by the studs 3 and the rollers 5, which rollers are in the groove of the clutch at opposite sides of the center of the shaft $d$. At the other side of the stud-bolt in said yoke-frames there are studs 4 and rollers 6 in the grooves of the cone-clutch $g$.

A yoke-lever $o$ is connected to the frame $b$ by a pivot-bolt 13, and the free ends of this yoke-lever come at opposite sides of the flanged gear $k'$, and they are provided with studs 14 and rollers 15. In the operation of the parts the power-shaft or prime mover $a$ rotates continuously in the direction of the arrow, revolving the gear $a'$ and the gears $e$ $e'$ with the cup parts $f'$ $g'$ of the cone-clutches. In the position of the parts shown in Fig. 1 both cone-clutches are disengaged. If the lever 10 is now moved by hand, so as to swing the yoke-frames $n$ $n'$ and bring the grooved cone portion $f$ of the cone-clutch into engagement with the cup portion $f'$, the parts are connected, so that the rotation of the gear $e$ by the gear $a'$ through the cone-clutches $f$ $f'$ causes a rotation of the shaft $d$, and therewith the sleeve $h$, the gear $k$, and the friction-wheel $i$, because the sleeve $h$ and the shaft $d$, as well as the sleeve $h'$ and the shaft $d'$, are connected to turn together by virtue of intervening spline members 16. The rotation of the sleeve $h$ and gear $k$ in one direction cause the rotation of the gear $k'$, the sleeve $h'$, and the shaft $d'$ in the opposite direction, thereby turning the friction-wheels $i$ $i'$ toward one another and rotating the friction disk-wheel $l$ and its shaft $l'$ in the direction of the arrow 20.

From Figs. 1 and 2 of the drawings it will be noticed that the friction-wheels $i$ $i'$ are bearing upon the sides of the wheel close to the periphery, or, in other words, upon the edge of the wheel. Consequently the disk-wheel $l$ is being turned at its slowest or minimum speed. If now the yoke-lever $o$ be moved, the sleeves $h$ $h'$, the friction-wheels $i$ $i'$, and the gears $k$ $k'$, which are coupled together by virtue of the flanges $k^2$, will be moved simultaneously in the direction of the shaft $l'$, thus bringing the friction-wheels $i$ $i'$ nearer to the hub of the wheel $l$, thus increasing the speed of the wheel $l'$ and its shaft.

If it is desired to reverse the motion of the friction disk-wheel $l$ and its shaft regardless of the position of the sleeves $h$ $h'$ and the friction-wheels $i$ $i'$, the lever 10 is to be moved in the opposite direction to actuate the link 9, rocker-arm 8, link 7, and the rocker-frames $n$ $n'$ on the stud-bolt $m$ in the opposite direction to disengage the parts of the groove cone-clutch $f$ $f'$ and engage the parts of the cone-clutch $g$ $g'$, then the power and movement are communicated from the shaft $a$ and gear $a'$ to the gear $e'$, cone-clutch $g$ $g'$, the shaft $d'$, the sleeve $h'$, the friction-wheel $i'$, gear $k'$ to turn the parts in the opposite direction, and consequently to turn the friction disk-wheel $l$ in the direction of the arrow 30.

The operations of this device are simple and quickly effected by a single attendant, and the speed may be regulated as desired because the friction-wheels $i$ $i'$ may be placed either as shown in Fig. 1, near the periphery of the wheel, or near the hub of the wheel or at any intermediate point.

I claim as my invention—

1. The combination with the shaft of a prime mover and a gear thereon, of parallel shafts one at each side of the prime-mover shaft, loose gears thereon meshing with the aforesaid gear, cone-clutches on said parallel shafts, means for operating the same, friction-wheels on the parallel shafts and means causing them to revolve together but in opposite directions, and a disk-wheel and shaft actuated by the friction-wheel, substantially as set forth.

2. The combination with the shaft of a prime mover and a gear thereon, of parallel shafts one at each side of the prime-mover shaft, loose gears thereon meshing with the aforesaid gear, cone-clutches on said parallel shafts, means for operating the same, friction-wheels on the parallel shafts and means causing them to revolve together but in opposite directions, means for moving said friction-wheels longitudinally of the shafts, and a disk-wheel and shaft actuated by the friction-wheel, substantially as specified.

3. The combination with the shaft of a prime mover, and a gear thereon, of parallel shafts one at each side of the prime-mover shaft, loose gears thereon meshing with the aforesaid gear, cone-clutches on said parallel shafts, the cup members of which are loose upon the shafts and firmly connected to said loose gears, and the cone members of which are splined on said shafts, means for operating the cone-clutches so as to engage either one at a time for effecting a forward or reverse movement, a disk-wheel and shaft and intermediate devices upon said shafts revolved thereby and adapted to actuate the disk-wheel and its shaft, substantially as specified.

4. The combination with the shaft of a prime mover and a gear thereon, of parallel shafts one at each side of the prime-mover shaft, loose gears thereon meshing with the aforesaid gear, cone-clutches on said parallel shafts, the cup members of which are loose upon the shafts and firmly connected to said loose gears and the cone members of which are splined on said shafts, means for operating the cone-clutches so as to engage either one at a time for effecting a forward or reverse movement, a disk-wheel and shaft, sleeves upon said parallel shafts, friction-wheels on corresponding ends of said sleeves adapted to engage the said disk-wheel to revolve the same and its shaft, and gears on the opposite ends of said sleeves meshing with one another causing the sleeves to turn together but in opposite directions, substantially as specified.

5. The combination with the shaft of a prime mover and a gear thereon, of parallel shafts one at each side of the prime-mover shaft, loose gears thereon meshing with the aforesaid gear, cone-clutches on said parallel shafts, the cup members of which are loose upon the shafts and firmly connected to said loose gears, and the cone members of which are splined on said shafts, means for operating the cone-clutches so as to engage either one at a time for effecting a forward or reverse movement, a disk-wheel and shaft, sleeves upon said parallel shafts, friction-wheels on corresponding ends of said sleeves adapted to engage the said disk-wheel to revolve the same and its shaft, gears on the opposite ends of said sleeves meshing with one another causing the sleeves to turn together but in opposite directions, and one of which gears is provided with flanges of sufficient area to embrace the edges of the other gear, and a lever device and parts associated therewith coming between said flanges and the movement of which is adapted to move said sleeves, friction-wheels and gears longitudinally of the parallel shafts so as to change the relation of the friction-wheels to the disk-wheel to increase or decrease the speed of rotation thereof.

6. In a power-transmission device, the combination with the shaft of a prime mover and the gear thereon, of parallel shafts one at each side of the prime-mover shaft, loose gears thereon meshing with the aforesaid gear, grooved cone-clutches on said parallel shafts, the cup portions of which are loose on said shafts but securely connected to the aforesaid loose gears, and the cone portions of which clutches are splined on said shafts, a stud-bolt coming between the said shafts and a support therefor, yoke-frames pivotally connected to said stud-bolt and at one end secured together, studs in pairs and rollers in pairs associated therewith and secured to the yoke-frames, the rollers being in the grooves of the cone-clutches, and means substantially as shown and described for swinging the yoke-frames upon the stud-bolt so as to cause the engagement of the parts of either of said cone-clutches for a forward or reverse movement.

7. In a power-transmission device, the combination with the shaft of a prime mover and a gear thereon, of parallel shafts one at each side of the prime-mover shaft, loose gears thereon meshing with the aforesaid gear, grooved cone-clutches on said parallel shafts, the cup portions of which are loose on said shafts but securely connected to the aforesaid loose gears, and the cone portions of which clutches are splined on said shafts, a stud-bolt coming between the said shafts and a support therefor, yoke-frames pivotally connected to said stud-bolt and at one end secured together, studs in pairs and rollers in pairs associated therewith and secured to the yoke-frames, the rollers being in the grooves of the cone-clutches, a pivoted rocker-arm, a link from one end of said rocker-arm to a pivotal connection with the joined ends of said yoke-frames, a pivoted lever adapted to be grasped by the hand at one end and a link pivotally connected to the opposite end of said lever and to the other end of said rocker-arm.

8. In a power-transmission device, the combination with a friction disk-wheel and its shaft to which power is to be applied, of parallel shafts coming at opposite sides of the disk-wheel and at right angles to the shaft of the disk-wheel, sleeves upon said shafts, friction-wheels on corresponding ends of said sleeves and adapted to engage the opposite sides of said disk-wheel to impart rotation thereto, gears meshing with one another and on the opposite corresponding ends of said sleeves, splines connecting said sleeves to said parallel shafts whereby the parts turn together, and means substantially as shown and described for applying power and movement to either of said parallel shafts.

9. In a power-transmission device, the combination with a friction disk-wheel and its shaft to which power is to be applied, of parallel shafts coming at opposite sides of the disk-wheel and at right angles to the shaft of the disk-wheel, sleeves upon said shafts, friction-wheels on corresponding ends of said sleeves and adapted to engage the opposite sides of said disk-wheel to impart rotation thereto, gears on the opposite corresponding ends of said sleeves, meshing with one another and one of which gears is provided with flanges overlapping the other gear so as to determine their relation for a longitudinal movement, splines connecting said sleeves to said parallel shafts whereby the parts turn together, a yoke-lever device and parts connected therewith coming between said flanges and adapted to shift the gears, the sleeves and friction-wheels longitudinally of the parallel shaft for varying the speed of the actuated disk-wheel, and means substantially as shown and described for imparting rotation and communicating power to either of said parallel shafts.

Signed by me this 27th day of February, 1904.

JAMES H. BAKER.

Witnesses:
WILLIAM J. DELANEY,
BEATRICE G. FARRINGTON.